United States Patent
Hetsko et al.

(10) Patent No.: US 10,044,465 B1
(45) Date of Patent: Aug. 7, 2018

(54) ADAPTIVELY DISRUPTING UNMANNED AERIAL VEHICLES

(71) Applicant: AAI Corporation, Hunt Valley, MD (US)

(72) Inventors: Brian Adam Hetsko, Lancaster, PA (US); John Bernard Kuhl, New Freedom, PA (US); Robert Johns, Westminster, MD (US); David Barone, New Freedom, PA (US)

(73) Assignee: AAI Corporation, Hunt Valley, MD (US)

( * ) Notice: Subject to any disclaimer, the term of this patent is extended or adjusted under 35 U.S.C. 154(b) by 0 days.

(21) Appl. No.: 15/424,435

(22) Filed: Feb. 3, 2017

(51) Int. Cl.
*H04K 3/00* (2006.01)
*G08G 5/00* (2006.01)
*G01S 19/21* (2010.01)
*G05D 1/00* (2006.01)
*B64C 39/02* (2006.01)
*H04L 29/08* (2006.01)

(52) U.S. Cl.
CPC ............ *H04K 3/90* (2013.01); *B64C 39/024* (2013.01); *G01S 19/215* (2013.01); *G05D 1/0011* (2013.01); *G08G 5/0039* (2013.01); *H04K 3/44* (2013.01); *H04K 3/65* (2013.01); *H04K 2203/22* (2013.01); *H04L 67/125* (2013.01)

(58) Field of Classification Search
CPC .. H04K 3/90; H04K 3/65; H04K 3/44; H04K 2203/22; G08G 5/0039; G01S 19/215; G05D 1/0011; B64C 39/024; H04L 67/125
See application file for complete search history.

(56) References Cited

U.S. PATENT DOCUMENTS

| 7,783,246 B2 | 8/2010 | Twitchell, Jr. et al. |
| 8,903,304 B2 | 12/2014 | Coleman et al. |
| 9,275,645 B2 | 3/2016 | Hearing et al. |

(Continued)

FOREIGN PATENT DOCUMENTS

| GB | 2536043 | 9/2016 |
| WO | 122739 | 8/2016 |

OTHER PUBLICATIONS

Dombroff, "The UAS Webinar Series—Defending against drones: The next step", http://www.planelyspokenblog.com/the-uas-webinar-series-defending-against-drones-the-next-step, posted Dec. 14, 2016.

(Continued)

*Primary Examiner* — Russell Frejd
(74) *Attorney, Agent, or Firm* — BainwoodHuang

(57) ABSTRACT

A technique for adaptively disrupting UAVs detects a target UAV using a camera, monitors the target UAV's communications using a directional antenna aligned with the camera, and attempts to communicate with the target UAV to request that it land, fly away, or return to launch. With the camera trained on the UAV, the directional antenna detects down-link signals from the UAV, which the UAV may employ to communicate with a ground-based controller. Control circuitry analyzes the down-link signals and generates a disrupting signal based thereon. The disrupting signal shares characteristics with the down-link signal, such as its protocol, bit rate, and/or packet length. The directional antenna transmits the disrupting signal back toward the UAV to affect the UAV's flight.

20 Claims, 6 Drawing Sheets

(56) References Cited

U.S. PATENT DOCUMENTS

| | | | |
|---|---|---|---|
| 9,523,773 | B2 | 12/2016 | Fink et al. |
| 9,529,360 | B1 | 12/2016 | Melamed et al. |
| 2008/0088508 | A1 | 4/2008 | Smith |
| 2016/0245907 | A1* | 8/2016 | Parker .................... F41H 11/02 |
| 2017/0069214 | A1* | 3/2017 | Dupray ................ G08G 5/0021 |
| 2017/0094527 | A1 | 3/2017 | Shattil et al. |
| 2017/0192089 | A1* | 7/2017 | Parker .................... G01S 3/782 |

OTHER PUBLICATIONS

Dentons, "Defending Against Drones:The Next Step", Jan. 5, 2017, pp. 1-30.
Notification of Transmittal of the International Search Report and the Written Opinion of the International Searching Authority, or the Declaration; International Application No. PCT/US2018/016196; dated May 24, 2018; pp. 1-15.

* cited by examiner

ADAPTIVELY DISRUPTING UNMANNED AERIAL VEHICLES

BACKGROUND

Unmanned Aerial Vehicles (UAVs) have many advantages and beneficial uses. Because UAVs do not require human pilots, they can be smaller, more maneuverable, and stealthier than piloted aircraft. UAVs can also operate in dangerous areas without risking injury to human pilots. However, government and law-enforcement entities may wish to restrict UAV operation around sensitive facilities and other areas due to safety, security, or privacy concerns.

Sometimes, measures are taken in restricted areas to detect and disable UAVs. Conventional approaches for detecting UAVs may employ human spotters, radar, or acoustic monitoring, for example. Conventional approaches for disabling UAVs may include capturing UAVs (in a net, for instance) or interfering with the UAV's communications. For example, one may interfere with a UAV by jamming the UAV's radio-frequency (RF) communications with a ground-based controller or by jamming global positioning system (GPS) signals that the UAV may require to navigate.

SUMMARY

Unfortunately, prior approaches for detecting and disabling UAVs have shortcomings. For instance, radar may be unable to detect small UAVs or to distinguish them from birds and other small objects. Acoustic detection may fail in noisy environments and in environments with buildings or other structures, which can block and reflect sound waves. Nets may be unsafe or impractical in public or populated areas. Jamming communications may interfere indiscriminately with nearby equipment, and GPS interventions may have undesirable effects on devices on which people rely.

In contrast with prior approaches, which can be ineffective and/or dangerous, an improved technique for disrupting UAVs detects a target UAV using a camera, monitors the target UAV's communications using a directional antenna aligned with the camera, and transmits signals to the target UAV to control its flight. With the camera trained on the UAV, the directional antenna receives down-link signals from the UAV, which the UAV may employ to communicate with a ground-based controller. Control circuitry processes the down-link signals and generates a disrupting signal based thereon. The disrupting signal shares characteristics with the down-link signals. For example, the disrupting signal may match the down-link signals in their protocol, bit rate, and/or packet length. In some cases, the disrupting signal conveys commands in the UAV's native protocol. The directional antenna transmits the disrupting signal back toward the UAV. Depending on whether initial attempts to disrupt the UAV succeed or fail, the technique may continue to monitor, process, and transmit disrupting signals to the UAV to direct the UAV to land or fly away. If communication fails to disable the UAV, an escalating progression of alternative methods may be employed to disrupt the UAV's flight.

One such intervention is to send large amounts of data to the UAV in a protocol that the UAV employs. These "denial-of-service" interventions may overwhelm the UAV and render it unable to receive or process valid navigation commands, such that the UAV flies away or returns to its launch location.

Another intervention is to jam RF communications of the UAV, rendering it unable to receive navigation commands from the ground-based controller.

Yet another intervention is to jam GPS signals or to send inaccurate GPS signals to the UAV.

One skilled in the art will appreciate that the improved technique has many advantages over prior approaches. For instance, communicating directly with a UAV and controlling it means that it may be possible to land or redirect the UAV safely, without placing people or property at risk. Even if direct control over the UAV cannot be achieved, a denial-of-service intervention can disrupt the UAV's flight without requiring high levels of power. The use of the directional antenna minimizes risk of unintentional interference with devices and equipment.

Various state and federal laws may limit activities for disrupting or otherwise interfering with UAVs. Embodiments hereof are therefore intended for use in areas where such activities are permitted by law and/or where they are authorized by applicable government or law enforcement entities.

Certain embodiments are directed to a method for disrupting operation of UAVs. The method uses a system that includes a pointing stage and a camera attached to the pointing stage, the camera having an optical axis. The system further includes a set of directional antennas attached to the pointing stage and aligned with the optical axis of the camera, and control circuitry, coupled to the pointing stage, the camera, and the set of directional antennas via RF circuitry. The method includes identifying a target UAV based upon image data acquired from the camera. With the set of directional antennas oriented toward the target UAV, the method includes detecting a set of down-link signals from the target UAV via the set of directional antennas. The method further includes analyzing the set of down-link signals and generating a disrupting signal based on the received set of down-link signals. The disrupting signal includes a pattern that shares a characteristic with the set of down-link signals. The method still further includes transmitting the disrupting signal toward the target UAV via the set of directional antennas.

Other embodiments are directed to an apparatus constructed and arranged to perform a method of disrupting UAVs, such as the method described above. Still other embodiments are directed to a computer program product. The computer program product stores instructions which, when executed on control circuitry, cause the control circuitry to perform a method of disrupting operation of UAVs, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for disrupting UAVs receives down-link signals from a UAV, processes the down-link signals, and generates a disrupting signal based thereon, which share characteristics with the down-link signals. Disrupting signals are transmitted back toward the UAV to disrupt the UAV's flight.

Figure 1:
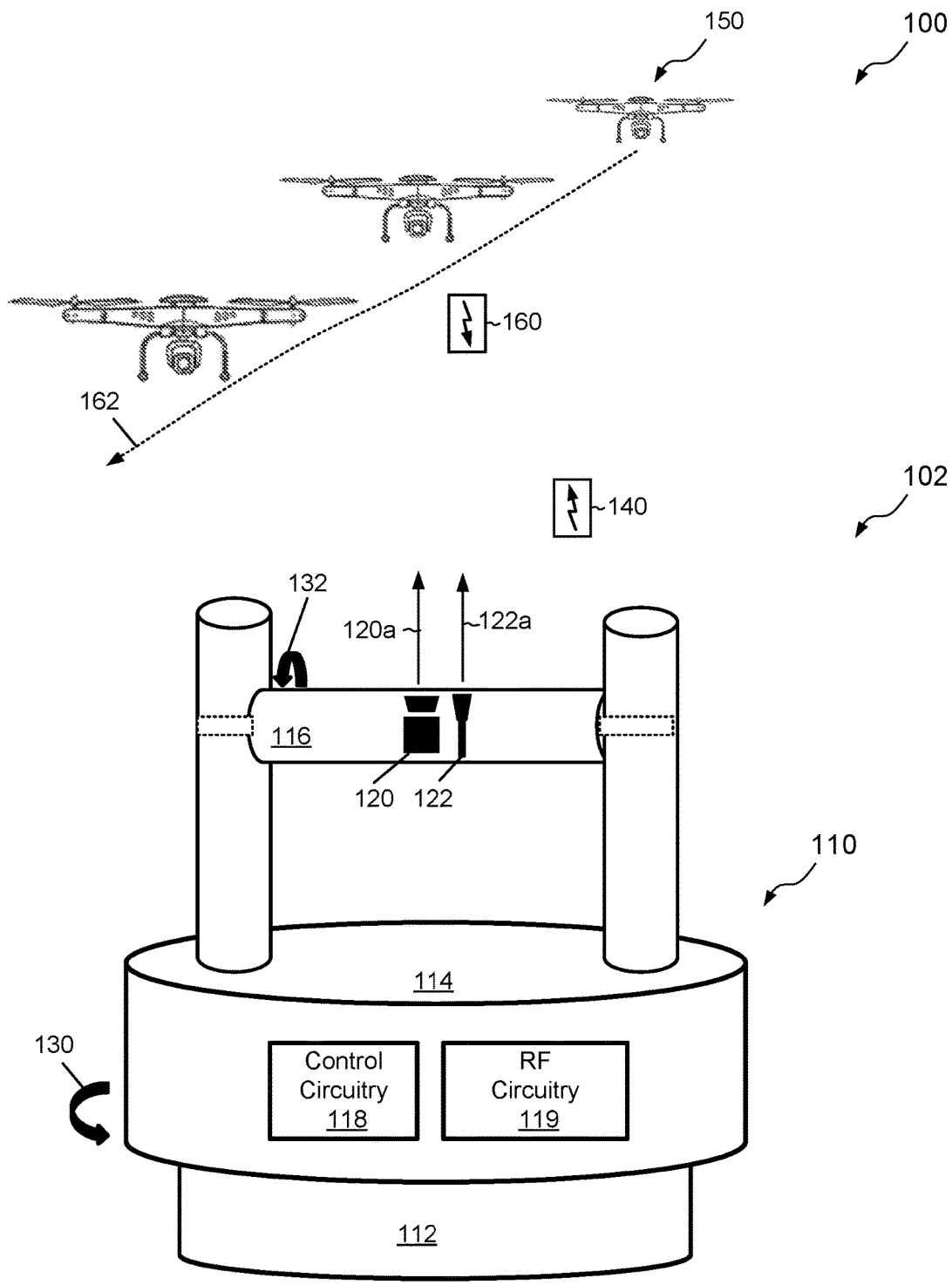
FIG. 1 is a schematic diagram of an example environment in which embodiments of the improved technique hereof can be practiced.

FIG. 1 shows an example environment 100 in which embodiments of the improved technique hereof can be practiced. Here, a UAV DDS (Detection and Disruption System) 102 is seen to include a pointing stage 110, which has a base 112, a panning stage 114, and a tilting stage 116. The tilting stage 116 is mounted to the panning stage 114, which is attached to the base 112. A camera 120 and a directional antenna 122 are attached to the tilting stage 116. Arrow 130 indicates a direction of rotation of the panning stage 114 in azimuth, relative to the base 112, and arrow 132 indicates a direction of rotation of the tilting stage 116 in altitude, relative to the panning stage 114. One should appreciate that the pointing stage 110 may be constructed in a variety of ways and that the particular example shown is merely illustrative.

The UAV DDS 102 further includes control circuitry 118 and RF circuitry 119. Such circuitry 118 and 119 may be disposed within the pointing stage 110 (as shown) or elsewhere, such as in a separate control box connected to the pointing stage 110. As will be described, the control circuitry 118 includes computerized hardware and software. The RF circuitry 119 includes, for example, RF switches, filters, amplifiers, and impedance-matching networks. These elements enable the control circuitry 118 to transmit and receive RF signals using the directional antenna 122. Although not specifically shown, the pointing stage 110 may also include motors, coupled to the control circuitry 118, for actuating rotation in directions 130 and 132, as well as optical encoders, for measuring angles of rotation in directions 130 and 132 and for providing such measurements to the control circuitry 118.

In an example, the camera 120 is an infrared camera configured to image infrared wavelengths. The camera may be configured to image particular portions of the infrared spectrum, such as mid-wave infrared or long-wave infrared, as dictated by particular use cases. For instance, various wavelengths may be better at resolving smaller objects or penetrating dense airborne particulates. The camera 120 preferably has zoom capability and operates in response to commands from the control circuitry 118 to generate digital images, which the camera 120 provides to the control circuitry 118 for analysis. In some cases, the camera 120 is implemented with multiple cameras. For example, different cameras may provide different magnification levels, frequency responses, and so forth.

The directional antenna 122 may be provided as a single broadband antenna, such as a horn antenna. Alternatively, the directional antenna 122 may be provided as a composite antenna containing multiple switchable antenna elements. As yet another alternative, the directional antenna 122 may be provided as multiple discrete antennas that operate over respective frequency ranges.

The directional antenna 122 (or antennas) is aligned with the camera 120. For example, the camera 120 has an optical axis 120a and the directional antenna 122 has an axis 122a of maximal power (transmission and/or reception). The axes 120a and 122a point in the same direction, such that the center of the camera's field of view corresponds to a point in space where the power to and/or from the antenna 122 is maximal. In some examples, the directionality of the antenna 122 may be accomplished electrically, e.g., by means of an electrically-steered phased array.

In example operation, the DDS 102 is positioned in a restricted area, such as a government facility. The DDS 102 scans its surroundings for suspect objects, e.g., targets that look like UAVs. In a particular example, the DDS 102 is configured specifically to detect so-called "micro UAVs," or "μUAVs," which are small units generally less than a meter across. These include, for example, commercially available quadcopters and other small flying devices. The DDS 102 may scan the sky in its environment according to some predetermined pattern, such as a spiral pattern that spins in the azimuth direction 130 and increments position in the altitude direction 132. The control circuitry 118 receives optical images from the camera 120 and performs image processing to identify suspect targets.

In an example, the camera 120 is set to an initial magnification that enables the camera to image a large field of view while still providing enough resolution to identify objects at least the size of μUAVs at a distance of two hundred meters or more. Upon identification of a suspect object, e.g., one that is surrounded by sky and is moving toward the DDS 102, the control circuitry 118 directs the camera 120 to zoom in on the suspect object for a closer view. Consistent with the Johnson Criteria for image recognition, the DDS 102 acquires an image of the suspect object containing at least nine pixels. The control circuitry 118 compares a zoomed image of the target with a library of known UAV shapes. If the control circuitry 118 matches the target image to a known type of UAV, the control circuitry may confirm identification and commence activities to disrupt the UAV.

FIG. 1 shows an example target UAV 150 operating over a flight path 162. Once identification is confirmed, the DDS 102 keeps the camera 120 trained on the target UAV 150. For example, the control circuitry 118 adjusts the pointing stage 110 in altitude and/or azimuth to keep the target UAV 150 approximately centered within the field of view of the camera 120. While pointing to the target UAV 150, the DDS 102 acquires and processes input from the antenna 122. For example, the control circuitry 118 attempts to detect a down-link signal 160 from the target UAV 150. The down-link signal 160 is a signal that the target UAV 150 transmits to a ground-based controller, which may be operated by a human or a machine.

In an example, the DDS 102 detects a down-link signal when RF power received by the directional antenna 122 pointed at the target UAV 150 exceeds a predetermined threshold, such as a multiple of a noise floor of input from the directional antenna 122. In some examples, the UAV DDS 102 may further confirm detection by moving the pointing stage 110 slightly off-axis from the target UAV and measuring a reduction in signal strength.

Once the DDS 102 detects a down-link signal 160, the control circuitry 118 analyzes the down-link signal 160, e.g., using spectral analysis, time-domain analysis, and/or other techniques, and characterizes the down-link signal 160. For example, the control circuitry 118 may detect a communication protocol used by the target UAV 150, e.g., Wi-Fi, Bluetooth, etc. Protocol detection may include identifying a modulation modality of the down-link signal 160, such as Frequency-Shift Keying (FSK), Phase-Shift Keying (PSK), Quadrature Amplitude Modulation (QAM), and so forth. In some examples, detection of modulation modality is separate from detection of protocol. The control circuitry 118 may also detect bit rate of data transmission, packet length, encoding (e.g., error-correction coding) and other characteristics of the down-link signals 160. As is known, "packet length" corresponds to a number of bits in each packet of the down-link signals 160. Once the control circuitry 118 has identified the modulation modality of the down-link signals 160, the control circuitry 118 may further identify the packet length by demodulating the down-link signals 160 and performing a time-domain analysis on the demodulated results.

With characteristics of the down-link signal 160 obtained, the DDS 102 proceeds to generate a disrupting signal 140. The control circuitry 118 generates the disrupting signal 140 based on the down-link signal 160, such that the disrupting signal 140 shares one or more characteristics with the down-link signal 160, such as modulation modality, bit rate, packet length, encoding, and the like. The control circuitry 118 then directs the directional antenna 122 to transmit the disrupting signal 140 back to the target UAV 150. For example, the DDS 102 continues to track the UAV 150 along its flight path 162 such that the directional antenna 122 is still aimed at the UAV 150 when the disrupting signal 140 is sent.

In some examples, the DDS 102 may identify a particular type of the target UAV 150 based on the obtained characteristics of the down-link signal 160. For example, the DDS 102 may maintain a database of known UAV types and may match the target UAV 150 to one of the known types based on the obtained characteristics. The DDS 102 may then attempt to communicate with the target UAV 150, e.g., by impersonating a ground-based controller and sending commands to the target UAV 150 in the protocol of the matching UAV type. In an example, the commands may direct the target UAV to land, fly away, or return to its launch location.

If no match is found to a known UAV type, the DDS 102 may still attempt to communicate with the target UAV 150, e.g., by sending a disrupting signal 140 that has one or more characteristics in common with the down-link signal 160 but that has other characteristics that are different. For example, if the DDS 102 detects a certain bit pattern repeated in the down-link signal 160 (or across multiple such signals), the DDS 102 may construct the disrupting signal 140 to have a bit pattern that slightly differs from the repeating pattern that was received, the intended effect being to confuse the target UAV 150 such that it departs from its flight plan and/or lands. In some examples, the DDS 102 may use disrupting signals 140 to probe the target UAV 150 and record its responses, adapting disrupting signals 140 as it detects new features in subsequent down-link signals 160.

After each attempt to disrupt operation of the target UAV 150, The DDS 102 may use the image data acquired from the camera 120 and/or subsequently-received down-link signals 160 to ascertain whether operation of the target UAV 150 has been successfully disrupted. For example, the DDS 102 may ascertain from the image data that the target UAV 150 has begun to depart from its flight path 162, in a direction away from the restricted area. Also, the DDS 102 may ascertain from the subsequent down-link signals 160 that the UAV 150 is transmitting responses consistent with a successful intervention.

If communicating with the target UAV 150 fails to disrupt its operation, the DDS 102 may escalate to a denial of service (DoS) intervention. In a DoS intervention, the DDS 102 sends multiple disrupting signals 140 in quick succession. Each disrupting signal 140 may have a modulation modality and/or a bit rate that matches that of the down-link signal 160, but each disrupting signal 140 need not include any clear command or instruction. Rather, the purpose of the disrupting signals 140 in a DoS intervention is to consume computing resources of the target UAV 150, so that it becomes difficult for the target UAV 150 to receive and respond to commands from its ground-based controller. For example, the disrupting signals 140 may flood a particular communication channel of the UAV 150 with a very large number of commands. If the UAV 150 is unable to receive and process such commands, the UAV 150 may simply land, fly away, or return to its launch location.

If even the DoS intervention fails, the DDS 102 may escalate further to an energy-based intervention. The energy-based intervention uses the directional antenna 122 still trained on the target UAV 150 to beam a high-powered, band-limited signal at the target UAV 150. The antenna 122 transmits the high-powered signal in a frequency range that the target UAV 150 uses to communicate. This frequency range may be the same as a frequency range of the down-link signals 160 or may be provided in a related frequency range, e.g., over a different channel that the target UAV is configured to use.

The power level of the high-powered signal is arranged to jam and overwhelm a receiver in the target UAV 150. For example, the high-powered signal uses random or pseudo-random, band-limited RF energy, transmitted at a power level that renders a receiver on the target UAV unable to discern command and control information from its ground-control forward link. An intended effect of the high-powered signal is to render the target UAV 150 without control input, such that it may land, fly away, or return to its launch location.

If all else fails, the DDS 102 may initiate a GPS (Global Positioning Satellite) intervention. The GPS intervention may transmit sufficiently high energy in a GPS frequency band, or bogus GPS signals, to confuse the target UAV 150 and force it to land or deviate from its current course.

Figure 2:
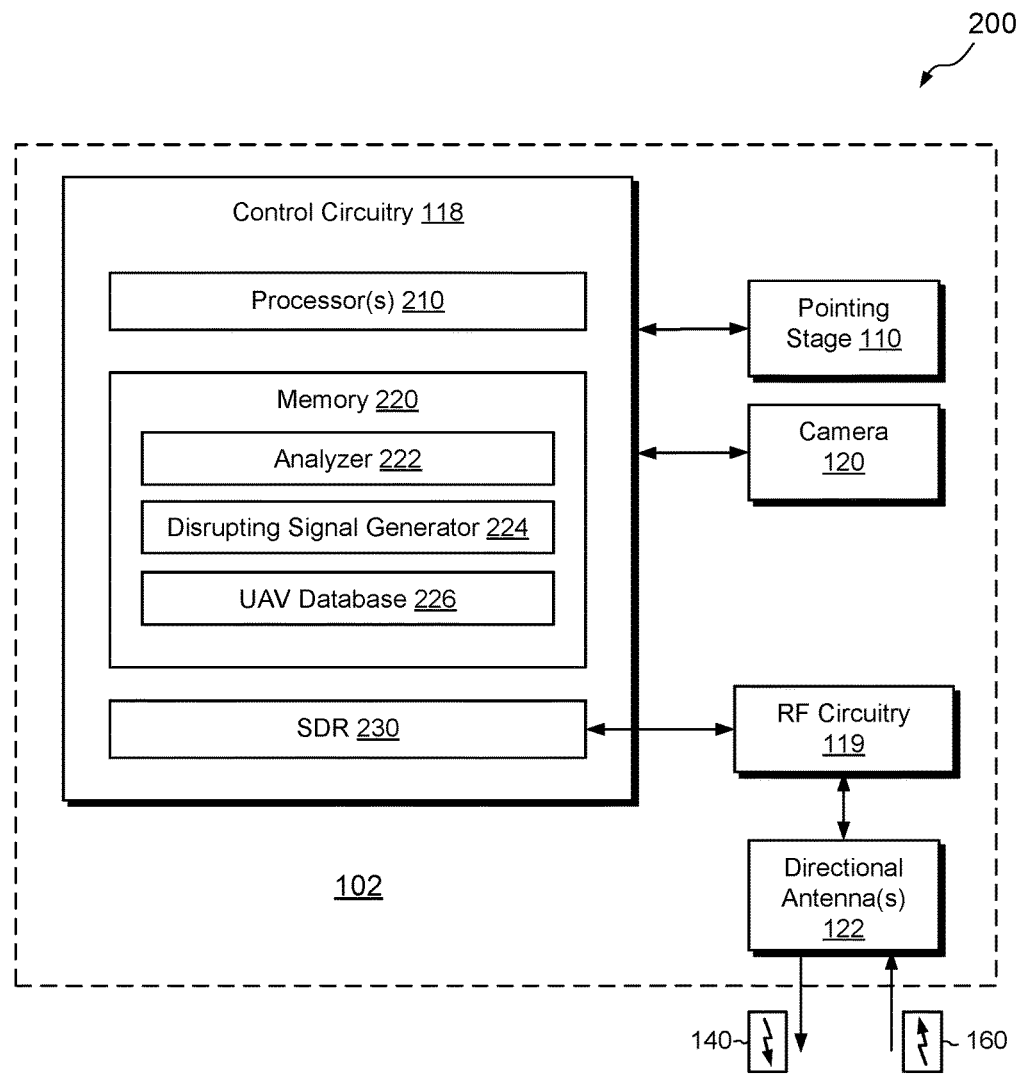
FIG. 2 is a block diagram of an example embodiment of the system and certain components thereof.

FIG. 2 is a block diagram 200 showing various components of the DDS 102 in further detail. In the example shown, the control circuitry 118 includes a set of processors 210 (i.e., one or more processing chips and/or assemblies), memory 220, and an SDR (Software-Defined Radio) device 230. The memory 220 may include both volatile memory (e.g., RAM) and non-volatile memory, such as one or more disk drives, solid state drives, and the like. The set of processors 210 and the memory 220 are constructed and arranged to carry out various methods and functions as described herein. Also, the memory 220 includes a variety of software constructs realized in the form of executable instructions. When the executable instructions are run by the set of processors 210, the set of processors 210 are caused to carry out the operations specified by the software constructs. Although certain software constructs are specifically shown and described, it is understood that the memory 230 typically includes many other software constructs, which are not shown, such as an operating system and various applications, processes, daemons, and so forth.

As further shown in FIG. 2, the memory 220 "includes," i.e., realizes using data and by operation of software instructions, a signal analyzer 222, a disrupting signal generator 224, and a UAV database 226. In an example, the signal analyzer 222 is configured to perform spectral analysis, time-domain analysis, and other forms of analysis on received down-link signals 160. The disrupting signal generator 224 generates disrupting signals 140 based on the received down-link signals 160. In some examples, the disrupting signal generator 224 works in coordination with the SDR 230 and may include SDR drivers and/or software tools.

In example operation, the directional antenna 122 receives down-link signals 160 from the target UAV 150. RF circuitry 119 amplifies, impedance-matches, and/or performs other functions to render the down-link signals 160 at a power level and bandwidth suitable for analysis. SDR 230 receives the processed down-link signals 160, digitizes the signals, and provides the digitized signals to the analyzer 222, which performs analysis as described elsewhere herein.

For outgoing signals, the disrupting signal generator 224 generates digital versions of the disrupting signals 140. The SDR 230 converts the digital versions to analog signals. The RF circuitry 119 processes the analog signals, and the directional antenna 122 transmits the processed analog signals as disrupting signals 140.

Figure 3:
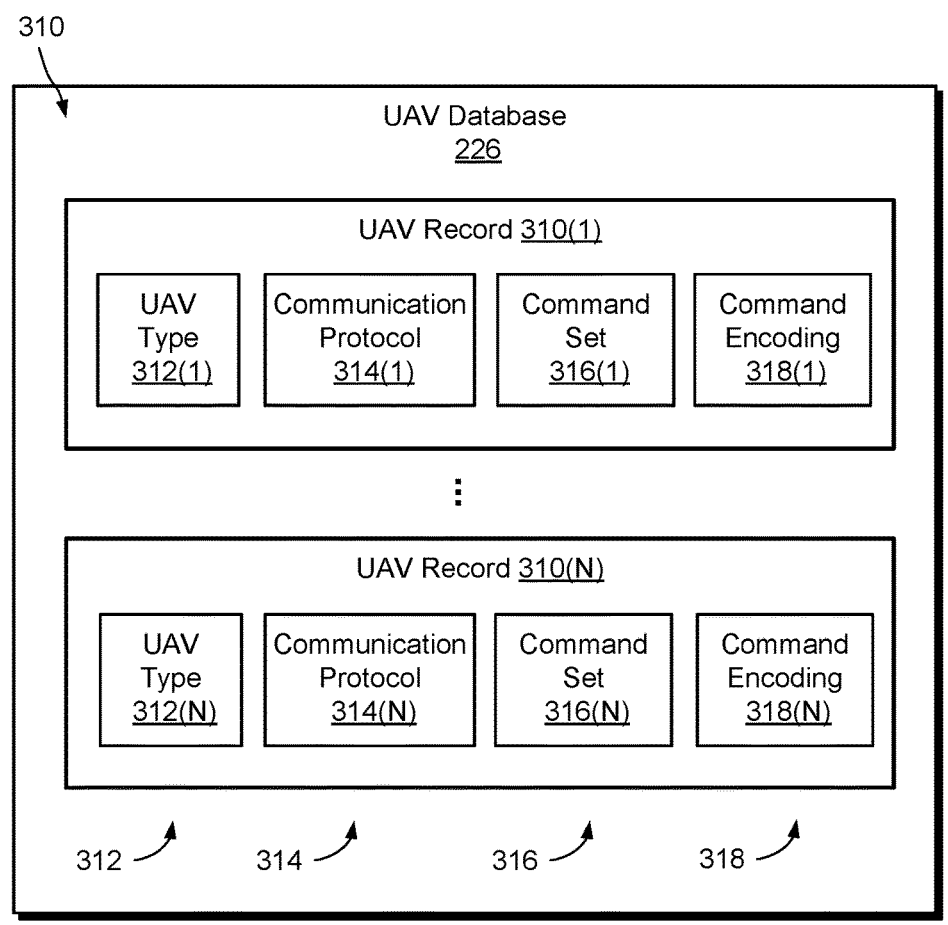
FIG. 3 is a block diagram of additional components and subcomponents of the example embodiment of FIG. 1 and FIG. 2.

FIG. 3 shows the UAV database 226 in additional detail. Here, the UAV database 226 is seen to contain UAV records 310, shown as UAV Record 310(1) through UAV Record 310(N). Each UAV record 310 stores a respective UAV Type identifier 312, communication protocol 314, and command set 316, and a command encoding 318. Each communication protocol 314 and each command set 316 respectively identify a communication protocol and command set for the respective UAV Type 312. Each communication protocol 314 specifies how the respective UAV type communicates, e.g., using Wi-Fi, Bluetooth, etc., the bit rate it uses (or multiple bit rates, if more than one applies), the packet length it uses, the modulation modality, and any other communication characteristics specific to the respective UAV type 312. The command sets 316 specify known commands for operating UAVs of the specified types 312. These may include an entire command library for particular UAV types 312, or individual commands for others. The UAV records 310 may also include command encodings 318 which identify encoding schemes (e.g., parity coding, Hamming coding, etc.) used for communications with the respective UAV types 312.

Figure 4:
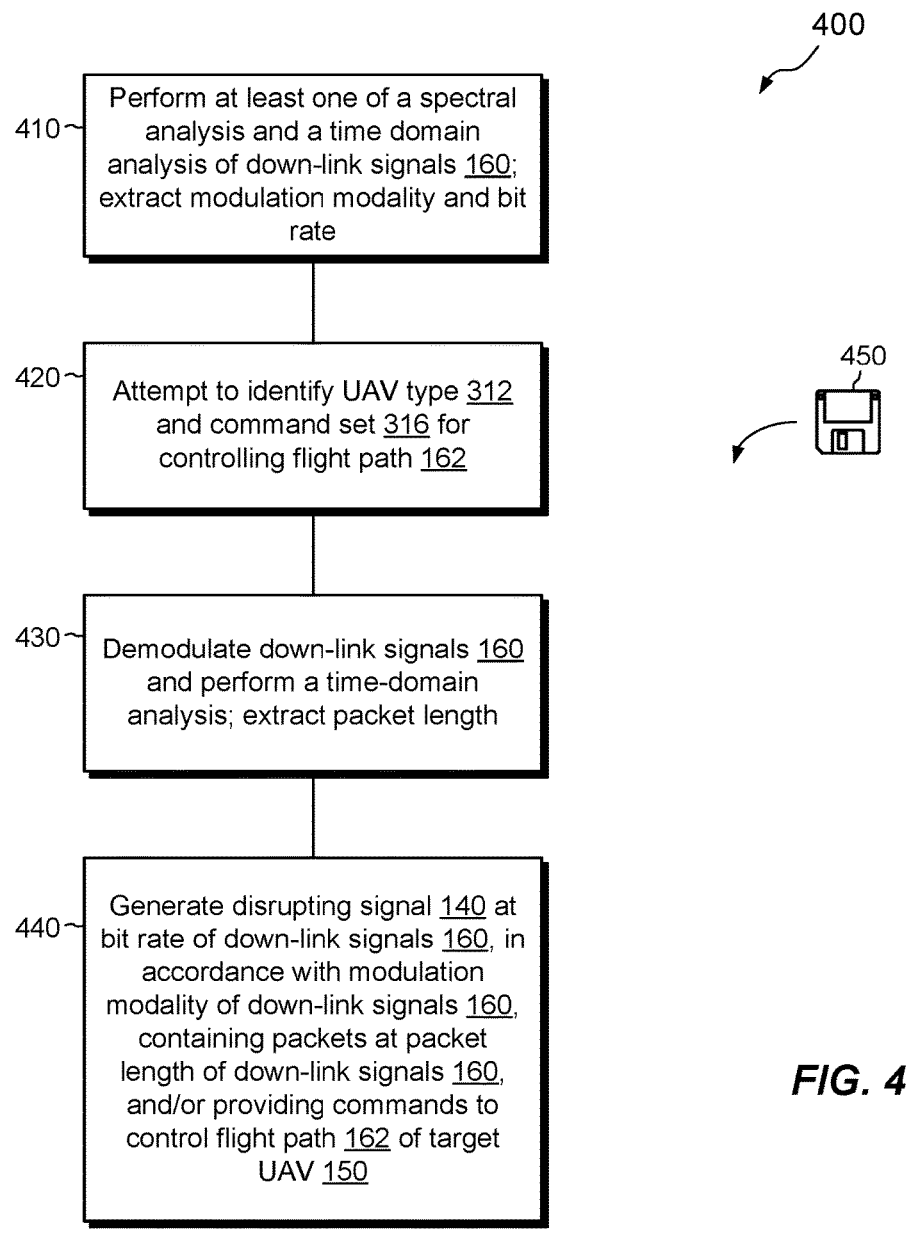
FIG. 4 is a flowchart of example method that may be carried out by an embodiment of the system of FIG. 1.
Figure 5:
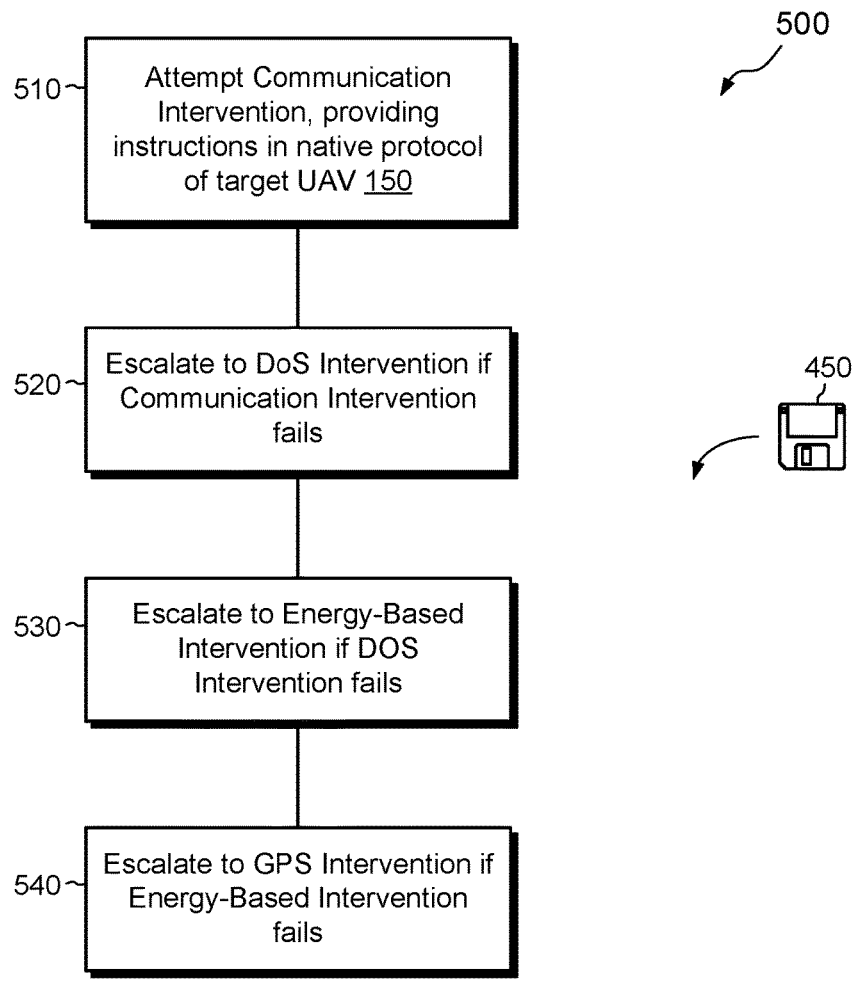
FIG. 5 is a flowchart of another example method that may be carried out by an embodiment of the system of FIG. 1.
Figure 6:
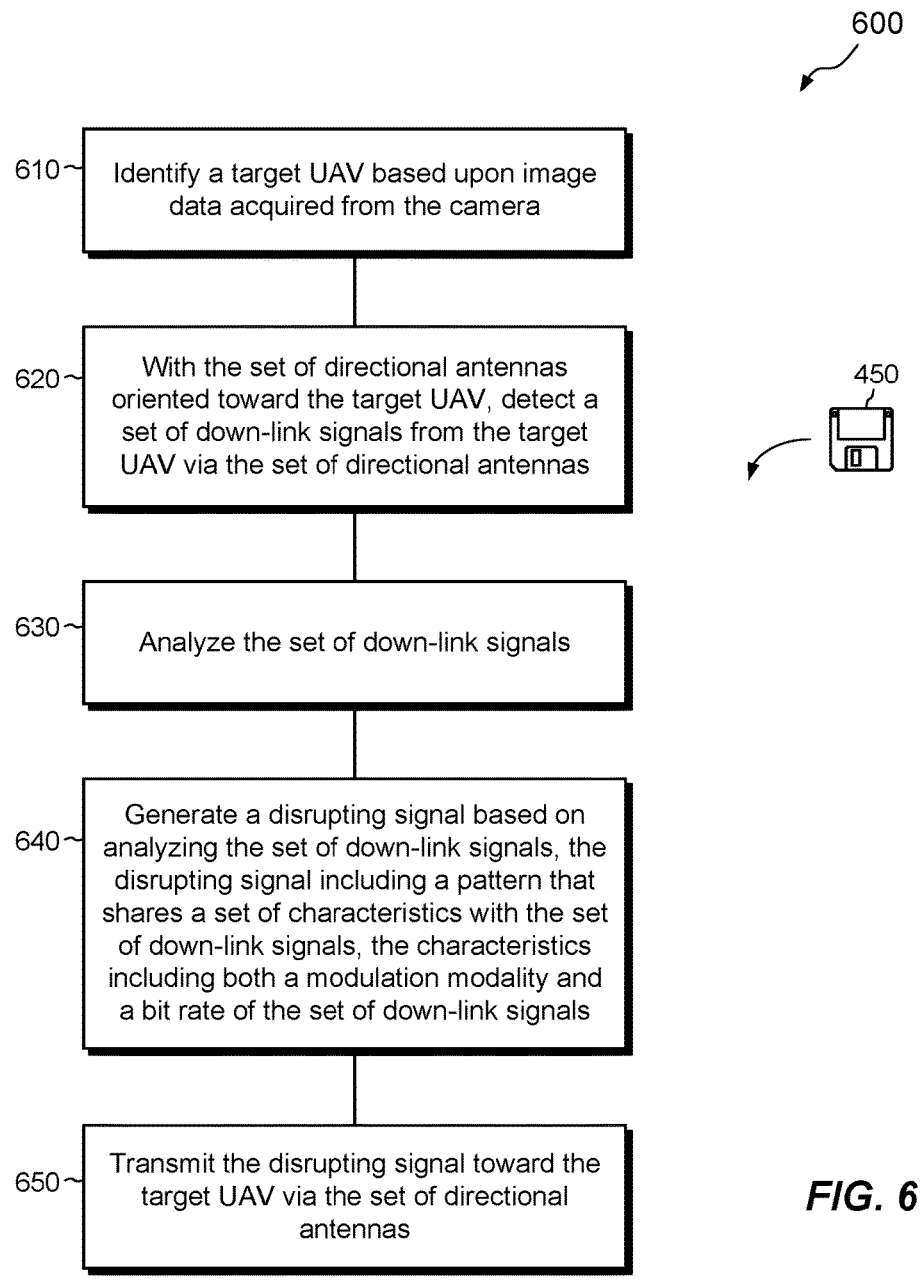
FIG. 6 is a flowchart of yet another example method that may be carried out by an embodiment of the system of FIG. 1.

FIGS. 4-6 show example methods that may be carried out in connection with the environment 100. The methods are typically performed, for example, by the software constructs described in connection with FIG. 2 and FIG. 3, which reside in the memory 220 of the control circuitry 118 and are run by the set of processors 210. The various steps of these methods may be ordered in any suitable way. Accordingly, embodiments may be constructed in which acts are performed in orders different from those illustrated, including performing some acts simultaneously.

FIG. 4 shows an example method 400 for generating a disrupting signal 140 based on one or more down-link signals 160. At 410, in the course of receiving down-link signals 160 from the target UAV 150, the DDS 102 performs an analysis of the down-link signals 160, including a spectral analysis (i.e., frequency domain) and/or a time domain analysis. The analysis identifies a modulation modality used by the target UAV 150. Spectral analysis by itself may be ineffective for some complex signals. Therefore, the DDS 102 may employ additional techniques, such as matched filtering, cyclostationary processing, and so forth.

Performing spectral and/or time-domain analysis of the down-link signals 160 reveals characteristics of a particular modulation modality and of the particular bandwidth over which the modulation modality is operated. For instance, the UAV 150 may employ various modulation modalities such as Phase-Shift Keying (PSK), Frequency-Shift Keying (FSK), Amplitude-Shift Keying (ASK), Quadrature Phase-Shift Keying (QPSK), Orthogonal Frequency Division Modulation (OFDM), or others. Once the modulation modality is identified, the DDS 102 also determines a bit rate at which information is transmitted by the UAV 150.

At 420, the system 102 attempts to identify the UAV 150 as a particular type of UAV based upon the modulation modality it uses and the bit rate at which it transmits.

In an example, the DDS 102 searches entries in the UAV Database 226. In some cases, the DDS 102 finds a communication protocol 314 that matches the identified modulation modality and bit rate found at step 410. The matching communication protocol 314 belongs to a UAV record 310, which also stores a corresponding UAV Type 312, command set 316, and command encoding 318. In other cases, no match is found in the UAV Database 226 and the DDS 102 may instead probe the UAV 150 for other means of disrupting the UAV's operation.

At 430, having identified the modulation modality, the system 102 demodulates the down-link signals 160. The DDS 102 then analyzes the demodulated down-link signals 160 in the time domain and measures the length (e.g., in bits) of packets in the down-link signal 160.

At 440, the DDS 102 generates the disrupting signal 140. The disrupting signal 140 is constructed to contain packets having the same length as those found in the down-link signals 160. If the DDS 102 was able to match the UAV 150 to an entry in the UAV database 226, then the DDS 102 may construct the disrupting signal 140 to contain instructions which cause the UAV 150 to land or fly away. Otherwise, the DDS 102 constructs the disrupting signal 140 to contain packets that match the general structure of packets received from the target UAV 150.

FIG. 5 shows an example method 500 for escalating interventions on the target UAV 150. At 510, the DDS 102 attempts a communication intervention against the target UAV 150. Such an intervention may involve communicating with the target UAV 150 using its own communication and command protocols, such as those found in the entries of the UAV database 226 (communication protocols 314, command sets 316, and command encodings 318). The communication intervention may also involve mimicking the target UAV's communications while changing certain characteristics in an effort to confuse the target UAV 150.

At 520, in response to failure of the communication intervention, the DDS 102 escalates to a denial of service (DoS) intervention against the target UAV 150 as described previously.

At 530, in response to failure of both the communication intervention and the DoS intervention, the DDS 102 escalates to an energy-based intervention against the target UAV 150, which attempts to disrupt the UAV's ability to receive instructions from a remote controller.

At 540, in response to failure of the communication intervention, the DoS intervention, and the energy-based intervention, the system escalates to a GPS intervention against the target UAV 150, which attempts to disrupt the UAV's ability to receive GPS information about its location. In some examples, the GPS intervention involves transmitting high-powered signals at GPS frequencies, to effectively jam a GPS receiver on the target UAV 150. In other examples, the GPS intervention may involve transmitting simulated GPS signals conveying inaccurate location information to the target UAV 150.

FIG. 6 shows an example method 600 for disrupting operation of UAVs. At 610, the DDS 102 identifies a target UAV 150 based upon image data acquired from the camera 120. In some examples, the control circuitry 118 may identify the target UAV 150 by analyzing a set of image data from the camera 120 and automatically detecting, as a potential target UAV 150, a moving object. The DDS 102 may perform additional processing to determine that moving object is a UAV and not another type of object, such as a bird.

At 620, the DDS 102 detects a set of one or more down-link signals 160 from the UAV 150 via the directional antenna 122. As the camera 120 is already trained on the target UAV 150 and the directional antenna 122 is aligned with the camera 120, the directional antenna 122 is also pointing toward the target UAV 150.

At 630 the DDS 102 analyzes the down-link signals detected at 620 to identify its characteristics, such as modulation modality, bit rate, encoding, and so forth.

At 640, the DDS 102 generates a disrupting signal 140 based on analyzing the down-link signals 160. The disrupting signal 140 includes a pattern that shares at least one characteristic with the set of down-link signals 160. Non-limiting example characteristics include a carrier frequency, a set of frequency bands, a modulation modality, a bit rate, and/or a packet length.

At 650, the DDS 102 transmits the disrupting signal 140 toward the target UAV 160 via the directional antenna 122 (or set of directional antennas, as discussed above).

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIGS. 4-6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method for disrupting operation of UAVs (Unmanned Aerial Vehicles), using a system that includes:
   a pointing stage;
   a camera attached to the pointing stage, the camera having an optical axis;
   a set of directional antennas attached to the pointing stage and aligned with the optical axis of the camera;
   RF (Radio Frequency) circuitry, coupled to the set of directional antennas; and
   control circuitry, coupled to the pointing stage, the camera, and the RF circuitry,
   the method comprising:
   identifying a target UAV based upon image data acquired from the camera;
   with the set of directional antennas oriented toward the target UAV, detecting a set of down-link signals from the target UAV via the set of directional antennas;
   analyzing the set of down-link signals;
   generating a disrupting signal based on analyzing the set of down-link signals, the disrupting signal including a pattern that shares a set of characteristics with the set of down-link signals, the characteristics including both a modulation modality and a bit rate of the set of down-link signals; and
   transmitting the disrupting signal toward the target UAV via the set of directional antennas.

2. A method as in claim 1, wherein the method further comprises, after transmitting the disrupting signal toward the target UAV:
   while continuing to monitor the target UAV, detecting that the target UAV has not responded to the disrupting signal by changing course and/or its down-link signals;

generating additional disrupting signals that differ from the disrupting signal; and transmitting the additional disrupting signals toward the target UAV via the set of directional antennas.

3. A method as in claim 2,
wherein analyzing the set of down-link signals includes performing
at least one of (i) a time-domain analysis and (ii) a spectral analysis on the set of down-link signals; and
wherein generating the disrupting signal includes producing, as part of the disrupting signal, a bit stream having a generated bit rate equal to the identified bit rate, and
wherein transmitting the disrupting signal toward the target UAV is performed in accordance with the identified modulation modality.

4. A method as in claim 3,
wherein analyzing the set of down-link signals includes identifying, based on the modulation modality and the bit rate, a particular type of UAV from a set of known UAV types, and
wherein producing the bit stream includes providing, within the bit stream, a set of flight control commands belonging to a command set of the particular type of UAV for altering a flight path of the particular type of UAV.

5. A method as in claim 3, wherein analyzing the down-link signals further includes:
demodulating the set of down-link signals in accordance with the identified modulation modality; and
measuring a packet length of packets in the demodulated set of down-link signals, the packet length describing a number of bits in the packets of the set of demodulated down-link signals,
wherein producing the bit stream includes providing, as part of the bit stream, multiple packets, each packet having a length equal to the measured packet length.

6. A method as in claim 3,
wherein analyzing the down-link signals further includes detecting, based on the set of down-link signals, a communication protocol used by the target UAV,
wherein producing the bit stream includes providing, as part of the bit stream, a set of the control commands for the particular type of UAV that direct a UAV of that particular type to alter its flight path, and
wherein transmitting the disrupting signal toward the target UAV is performed in accordance with detected communication protocol of the target UAV.

7. A method as in claim 6, further comprising, after transmitting the disrupting signal:
in response to detecting that the target UAV has not responded to the disrupting signal while continuing to monitor the target UAV, transmitting multiple disrupting signals to the target UAV in succession to deploy a denial of service (DoS) intervention directed to the target UAV.

8. A method as in claim 7, further comprising, after deploying the DoS intervention:
in response to detecting that the target UAV has not responded to the DoS intervention while continuing to monitor the target UAV, deploying an energy-based intervention by transmitting a signal of band-limited RF energy toward the target UAV via the set of directional antennas.

9. A method as in 8, further comprising, after deploying the energy-based intervention:
in response to detecting that the target UAV has not responded to the energy-based intervention while continuing to monitor the target UAV, deploying a Global Positioning Satellite (GPS) intervention by transmitting a set of GPS signals toward the target UAV via the set of directional antennas.

10. An apparatus for disrupting operation of UAVs (Unmanned Aerial Vehicles), the apparatus comprising:
a pointing stage;
a camera attached to the pointing stage, the camera having an optical axis;
a set of directional antennas attached to the pointing stage and aligned with the optical axis of the camera;
RF circuitry, coupled to the set of directional antennas; and
control circuitry, coupled to the pointing stage, the camera, and the set of directional antennas via the RF circuitry, the control circuitry constructed and arranged to:
identify a target UAV based upon image data acquired from the camera;
with the set of directional antennas oriented toward the target UAV, detect a set of down-link signals from the target UAV via the set of directional antennas;
analyze the set of down-link signals;
generate a disrupting signal based on analyzing the set of down-link signals, the disrupting signal including a pattern that shares a set of characteristics with the set of down-link signals, the characteristics including both a modulation modality and a bit rate of the set of down-link signals; and
transmit the disrupting signal toward the UAV via the set of directional antennas.

11. An apparatus as in claim 10,
wherein the control circuitry, constructed and arranged to analyze the down-link signals, is further constructed and arranged to:
demodulate the set of down-link signals in accordance with the identified modulation modality;
measure a packet length of packets in the demodulated set of down-link signals, the packet length describing a number of bits in the packets in the set of demodulated down-link signals, and
wherein the control circuitry, constructed and arranged to produce the bit stream, is further constructed and arranged to provide multiple packets within the bit stream, each packet having a length equal to the measured packet length.

12. An apparatus as in claim 10,
wherein the control circuitry, constructed and arranged to analyze the down-link signals, is further constructed and arranged to:
detect, based on an analysis of the set of down-link signals, a communication protocol used by the target UAV; and
identify (i) a particular type of UAV, from among multiple known types of UAVs, that uses the detected communication protocol and (ii) multiple control commands for operating that particular type of UAV,
wherein the control circuitry, constructed and arranged to generate the disrupting signal, is further constructed and arranged to provide, as part of the disrupting signal, a set of the control commands for the particular type of UAV that direct a UAV of that particular type to alter its flight path, and wherein the control circuitry is constructed and arranged to transmit the disrupting signal toward the target UAV in accordance with detected communication protocol of the target UAV.

13. A computer program product including a set of non-transitory, computer-readable media having instructions which, when executed by control circuitry, cause the control circuitry to perform a method of disrupting operation of UAVs (Unmanned Aerial Vehicles), the method comprising:
   identifying a target UAV based upon image data acquired from a camera;
   detecting a set of down-link signals from the target UAV via a set of directional antennas oriented toward the target UAV and aligned with the camera;
   analyzing the set of down-link signals;
   generating a disrupting signal based on analyzing the set of down-link signals, the disrupting signal including a pattern that shares a set of characteristics with the set of down-link signals, the characteristics including both a modulation modality and a bit rate of the set of down-link signals; and
   transmitting the disrupting signal toward the target UAV via the set of directional antennas.

14. A computer program product as in claim 13, wherein the method further comprises, after transmitting the disrupting signal toward the target UAV:
   while continuing to monitor the target UAV, detecting that the target UAV has not responded to the disrupting signal by changing course and/or its down-link signals;
   generating additional disrupting signals that differ from the disrupting signal; and
   transmitting the additional disrupting signals toward the target UAV via the set of directional antennas.

15. A computer program product as in claim 14,
   wherein analyzing the set of down-link signals includes performing
      on the set of down-link signals from the target UAV, at least one of: (i) a time-domain analysis and (ii) a spectral analysis; and
   wherein generating the disrupting signal based on the analysis of the received set of down-link signals includes producing, as part of the disrupting signal, a bit stream having a generated bit rate equal to the identified bit rate, and
   wherein transmitting the disrupting signal toward the target UAV is performed in accordance with the identified modulation modality.

16. A computer program product as in claim 15,
   wherein analyzing the down-link signals includes:
      demodulating the set of down-link signals in accordance with the identified modulation modality; and
      measuring a packet length of packets in the demodulated set of down-link signals, the packet length describing a number of bits in the packets in the set of demodulated down-link signals, and
   wherein producing the bit stream includes providing multiple packets within the bit stream, each packet having a length equal to the measured packet length.

17. A computer program product as in claim 15,
   wherein analyzing the down-link signals further includes:
      detecting a communication protocol used by the target UAV; and
      identifying (i) a particular type of UAV, from among multiple known types of UAVs, that uses the detected communication protocol and (ii) multiple control commands for operating that particular type of UAV,
   wherein generating the disrupting signal further includes providing, as part of the disrupting signal, a set of the control commands for the particular type of UAV that direct a UAV of that particular type to alter its flight path, and
   wherein transmitting the disrupting signal toward the target UAV is performed in accordance with detected communication protocol of the target UAV.

18. A computer program product as in claim 17, wherein the method further comprises, after transmitting the disrupting signal:
   in response to detecting that the target UAV has not responded to the disrupting signal while continuing to monitor the target UAV, transmitting multiple disrupting signals to the target UAV in succession to deploy a denial of service (DoS) intervention directed to the target UAV.

19. A computer program product as in claim 18, wherein the method further comprises, after deploying the DoS intervention,
   in response to detecting that the target UAV has not responded to the DoS intervention while continuing to monitor the target UAV, deploying an energy-based intervention by transmitting a signal of band-limited RF energy toward the target UAV via the set of directional antennas.

20. A computer program product as in 19, wherein the method further comprises, after deploying the energy-based intervention,
   in response to detecting that the target UAV has not responded to the energy-based intervention while continuing to monitor the target UAV, deploying a Global Positioning Satellite (GPS) intervention by transmitting a set of GPS signals toward the target UAV via the set of directional antennas.

* * * * *